Feb. 6, 1940.   D. H. ANDREWS   2,189,122
METHOD OF AND APPARATUS FOR SENSING RADIANT ENERGY
Filed May 18, 1938
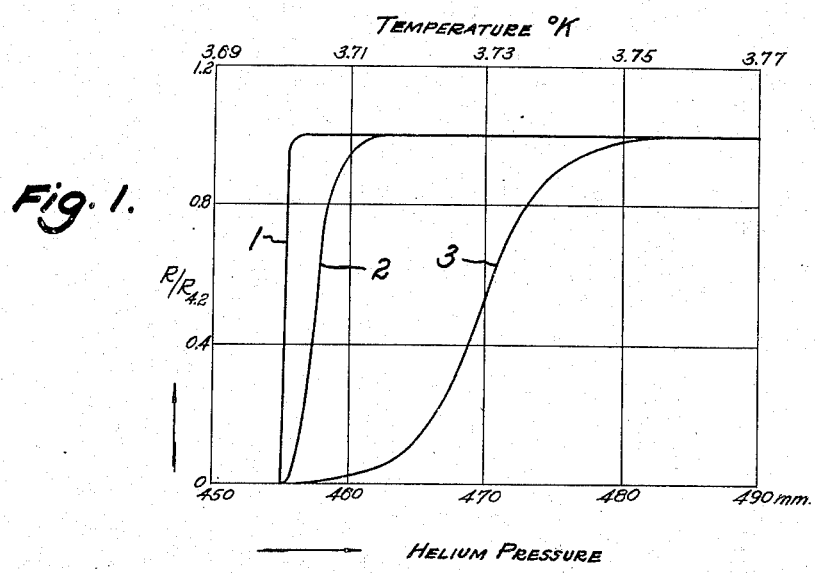
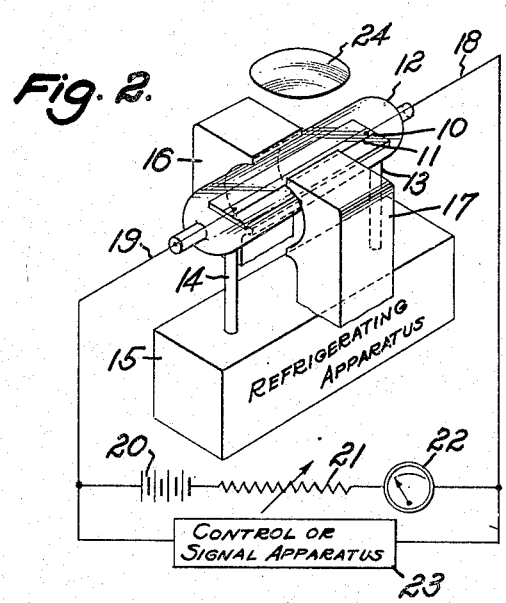
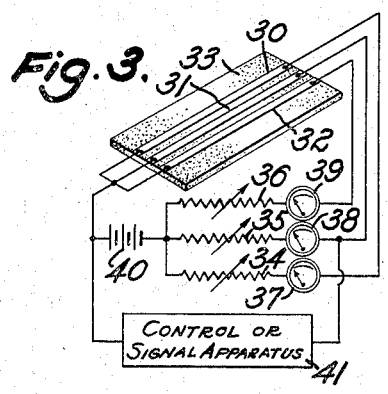
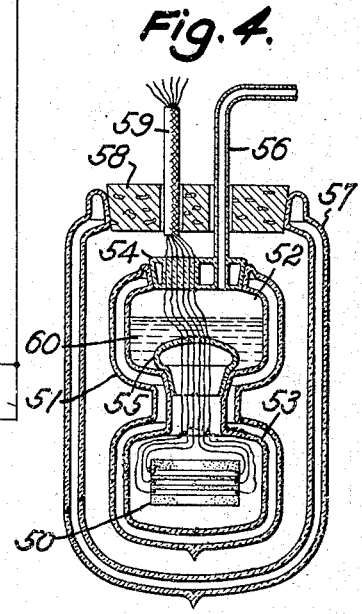
Inventor:
Donald H. Andrews
By Potter, Pierce & Scheffler
Attorneys.

Patented Feb. 6, 1940

2,189,122

UNITED STATES PATENT OFFICE 2,189,122

METHOD OF AND APPARATUS FOR SENSING RADIANT ENERGY

Donald H. Andrews, Baltimore, Md., assignor to Research Corporation, New York, N. Y., a corporation of New York Application May 18, 1938, Serial No. 208,731

10 Claims. (Cl. 250—25)

This invention relates to methods of and apparatus for sensing radiant energy, and particularly to methods of and apparatus for varying or modulating the magnitude of an electric current in accordance with the presence of or the fluctuating magnitude of radiant energy such as light or heat waves.

The invention contemplates the control of electrical energy in accordance with the changes in the magnitude of a selected type of radiant energy, and with an efficiency or sensitivity of an order substantially higher than has been obtainable with prior methods and apparatus. The invention may be employed to detect the presence of radiant energy by producing a sharp rise in the resistance of a conductor upon which the radiant energy impinges, or for modulating an electrical current passing through such a conductor as the effective resistance thereof varies with the magnitude of the impinging radiant energy.

The resistance of a wire or other conductor decreases with decreasing temperature and falls suddenly substantially to zero at critical "transition" temperatures which differ for different metals and materials and which are in the region of absolute zero. This transition from a condition of normal conductivity to one of super-conductivity takes place in a temperature range of the order of from a few hundredths to a few thousandths of one degree, depending upon the particular conductor material, and temperature variations of this order may be produced in conductors of appropriate design by radiant energy, such as visible or invisible light rays, heat rays and the like, of very small magnitudes, especially since the heat capacities of substances become very low at temperatures approaching absolute zero so that a given amount of absorbed energy causes a much greater increase in temperature at temperatures near absolute zero than at ordinary temperatures.

The radiant energy impinging upon a superconductor in the form of a minute metal strip or film, i. e., a strip or film at a temperature immediately below that at which its resistance is approximately zero, may raise the temperature of the film or strip by a small fraction of one degree, but this small rise in temperature will increase the resistance of the film or strip to a high value, for example of the order of 1000 ohms. The magnitude of the current flow established through the conductive film or strip by a fixed source of potential will therefore fluctuate over a wide range in accordance with the temperature imparted to the conductor by the radiant energy, and these changes in current flow may actuate measuring and/or control equipment.

Extremely high sensitivity may be obtained by supplementing the heating action of the received radiant energy by an initial relatively heavy current flow through the conductive film. This initial current flow has substantially no heating effect so long as the conductive film is at less than its transition temperature, but if the film is originally at a temperature just below its transition temperature any increase in the temperature of even a small part of the conductive film, as a result of received radiant energy, imparts a finite resistance to the conductive film and the current flow then has a heating effect which results in a further temperature rise and an attendant increase in the resistance of the film. A sensitivity which results in an appreciable current pulse in response to an amount of radiant energy of the order of a few quanta of radiant energy is possible by appropriate design of the conductive film, its supporting structure and temperature control mechanism. By means of this invention, it is therefore possible to detect and measure minute amounts of radiant energy, and to utilize very small variations in amount of radiant energy to modulate an electric current correspondingly.

The conductive film is advantageously maintained at the necessary low temperature by means of a liquefied gas, such as liquid helium, in heat transfer relationship with the film. The adjustment of the temperature to the point of maximum, or desired sensitivity, immediately below the transition temperature, may be effected by varying the pressure on the liquefied gas, by varying the flow of current through the film or through an auxiliary film in heat transfer relationship to the principal conductor, or by subjecting the film to the action of a magnetic field, thereby utilizing the cooling effect of a magnetic field upon substances at temperatures in the neighborhood of absolute zero.

Objects of this invention are to provide improved methods of and apparatus for controlling the magnitude of electrical energy as a function of the magnitude of radiant energy. Other objects are to provide methods of and apparatus for producing electrical current variations that are reproductions, on an enormously enlarged scale, of the variations in the magnitude of radiant energy. Further objects are to provide methods of and apparatus for varying the temperature of a conductor by directing radiant energy upon the conductor, the conductor being initially at a temperature just below its transition point, whereby the resistance of the conductor may be varied over a wide range by the received radiant energy. More specifically, an object of the invention is to provide electrical control apparatus including an electrically conductive strip or film, a cooling system for normally maintaining the conductive strip at a temperature immediately below its transition point, a circuit for the conductor strip which includes a source of current and a measuring or output element, and devices for directing radiant energy upon the conductive strip. Additional objects are to provide various types of control or measuring apparatus which include an electrical conductor normally held immediately below its transition temperature, and devices for varying the temperature of the conductor as a function of the magnitude of radiant energy.

These and other objects and advantages of the invention will be apparent from the following specification when taken with the accompanying drawing in which:

Fig. 1 is a graph showing the variation with temperature of the resistance of different conductors in the region of their transition temperatures;

Fig. 2 is a schematic diagram of apparatus embodying the invention;

Fig. 3 is a perspective view of a conductor element assembly; and

Fig. 4 is a sectional view through a conductor unit assembly.

In Fig. 1, the ordinates of the curves are the ratios of the resistance to the resistance at 4.2° K., while the abscissas are indicated at the bottom of the graph as equivalent helium pressure in millimeters of mercury and at the top in ° K. 1 is the resistance curve of a sample of pure unicrystalline tin, 2 is the curve of a sample of polycrystalline tin and 3 is the curve of a sample of polycrystalline tin containing impurities. The sharp inflections in the curves represent the critical transition temperatures of the substances. The sample represented by curve 1 has a very sharp inflection at the transition point. Material of this type would provide a conductor element of very great sensitivity as a very slight increase in temperature would result in a very great relative increase in resistance. The sample represented by curve 3 would provide a conductor element of less sensitivity than that of curve 1, but by adjusting the constants of the conductor unit so that the temperature range of operation is maintained in the straight portion of the curve adjacent 3.73° K., a response proportional to incident energy can be obtained.

In the apparatus shown schematically in Fig. 2, 10 is the conductor strip mounted on a quartz plate 11. Strip 10 is formed of a suitable conductive material such as tin. This strip may be, for example, 0.1 millimeter wide, 1 centimeter long and .01 millimeter thick. In place of tin other suitable materials such as lead, critical temperature about 7° K., aluminum, about 1° K., niobium, about 9° K., and niobium carbide, about 10° K., may be used.

The conductor element is mounted in a gastight envelope 12, advantageously a glass vessel of suitable size and shape, which is connected through tubes 13, 14 to a refrigerating apparatus 15 capable of cooling the interior of the envelope down to the transition temperature of the conductive strip.

The poles 16, 17 of an electromagnet are positioned on each side of the envelope so as to provide a magnetic field around the conductor element for the further regulation of its temperature.

Sealed-in conductors 18, 19 connect the conductor strip to a circuit including a source of current 20, a variable resistance 21 and a current measuring device such as milliammeter 22. A control or signal apparatus 23 is connected into this circuit across the conductor strip. Apparatus 23 may include a vacuum tube circuit of known type for amplifying the variations in potential across the conductor strip.

A condenser or lens system 24 may be used to concentrate the radiant energy to be detected upon the conductor strip.

In the conductor assembly of Fig. 3, conductor strips 30, 31, 32 of relatively small mass are mounted on a quartz plate 33 and are connected through suitable circuit elements including variable resistances 34, 35, 36 and milliammeters 37, 38, 39 to a source of current 40. Control or signal apparatus 41 is connected across conductor strip 31 which is the sensitive element of the assembly. Either of conductor strips, 30, 32, or if desired both of these strips, may be utilized to control the temperature of the assembly by suitable regulation of the amount of current permitted to pass therethrough. If only one of the strips is utilized for temperature regulation, the other may be utilized for determining the temperature by comparing the flow of current at suitable settings of the variable resistance element with a previously determined calibration curve. Advantageously, conductor strips 30 and 32 are formed of a conductive material having a transition temperature below that of conductor strip 31, so that under the conditions of operation they will be above their transition temperatures and in a region where the resistance is a relatively uniform function of the temperature.

The conductor unit assembly in Fig. 4 comprises a conductor element assembly 50 similar to that illustrated in Fig. 3. The conductor element assembly is mounted in a glass vacuum jacketed on Dewar vessel 51, which has a constriction in the middle defining upper and lower chambers 52 and 53, respectively. The lead conductors to the conductor strips are sealed into ground-in glass stoppers 54 and 55 of the upper and lower chambers, respectively. Stopper 55 is provided with a tube 56 leading to a suitable helium supply device, vacuum pump and manometer, not shown. Vessel 51 is enclosed in a second Dewar vessel 57 which is closed by a cork stopper 58 through which lead cable 59 and tube 56 pass.

To prepare the assembly for use, the air in the vessel 51 is replaced by helium, the pressure in the vessel is reduced to about 0.1 millimeter. Liquid helium 60 is then introduced into chamber 52 and is subjected to an absolute pressure corresponding to a boiling temperature immediately below the transition temperature of the sensitive conductor strip.

The control, measuring and signal circuits to the conductive strips of the conductor assembly 50 may be as shown in Fig. 3.

The term "output element" is used hereinafter to denote control, measuring and signal devices responsive to variations in potential or current flow across the conductor strip of the apparatus of the invention.

It will be seen that the invention provides a method and means whereby minute amounts of radiant energy may be sensed and whereby an electric current may be modulated by radiant energy in minute amounts. Since the sensitivity of the methods and apparatus of the invention is not limited to radiant energy of certain wave lengths as in the case with photoelectric cells, the invention is particularly useful in the detection and measurements of small amounts of infra-red radiation, although it is not limited to such radiation, but is sensitive to any radiation which affects the temperature of the conductor strip of the device.

I claim:

1. A method of modulating an electric current by radiant energy which comprises maintaining a conductor at a temperature immediately below its transition temperature, passing an electric current through said conductor and causing radiant energy to impinge upon said conductor.

2. A method of sensing radiant energy which comprises maintaining a conductor at a temperature immediately below its transition temperature, passing an electric current through said conductor and directing radiant energy to be sensed upon said conductor.

3. A method of sensing radiant energy which comprises maintaining a conductor at a temperature immediately below its transition temperature, passing an electric current through said conductor, directing radiant energy to be sensed upon said conductor, and determining the effect of said radiant energy on the conductivity of said conductor.

4. A method of sensing radiant energy which comprises establishing a steady state of heat exchange to maintain a conductor at a temperature immediately below its transition temperature with an electric current flowing therethrough, directing radiant energy to be sensed upon said conductor and determining the alteration in heat exchange conditions necessary to maintain said conductor at said temperature.

5. A method of sensing radiant energy which comprises cooling a conductor to approximately its transition temperature, adjusting the temperature to immediately below its transition temperature with an electric current flowing therethrough by means of a heating electric current adjacent said conductor, directing radiant energy to be sensed upon said conductor and determining the alteration in said heating electric current necessary to maintain said temperature.

6. A method of sensing radiant energy which comprises cooling a conductor to approximately its transition temperature, adjusting the temperature to immediately below its transition temperature with an electric current flowing therethrough by means of a magnetic field, directing radiant energy to be sensed upon said conductor and determining the alteration in said magnetic field necessary to maintain said temperature.

7. A device for sensing radiant energy comprising a conductor, a cooling system for normally maintaining the conductor at a temperature immediately below its transition point, circuit elements for passing an electric current through said conductor including a source of current and an output element, and means for directing radiant energy upon said conductor.

8. A device for sensing radiant energy comprising a conductor, a cooling system including a refrigerant medium and an electric heating circuit for normally maintaining the conductor at a temperature immediately below its transition point, circuit elements for passing an electric current through said conductor including a source of current and an output element, and means for directing radiant energy upon said conductor.

9. A device for sensing radiant energy comprising a conductor, a cooling system including a refrigerant medium and means providing a magnetic field for normally maintaining the conductor at a temperature immediately below its transition point, circuit elements for passing an electric current through said conductor including a source of current and an output element, and means for directing radiant energy upon said conductor.

10. A device for sensing radiant energy comprising a conductive strip, a cooling system for normally maintaining the strip at a temperature immediately below its transition point, circuit elements for passing an electric current through said strip including a source of current and an output element, and means for directing radiant energy upon said strip.

DONALD H. ANDREWS.